United States Patent [19]

Feder et al.

[11] Patent Number: 4,477,086
[45] Date of Patent: Oct. 16, 1984

[54] SEAL RING WITH SLIDABLE INNER ELEMENT BRIDGING CIRCUMFERENTIAL GAP

[75] Inventors: Ernest Feder, West Hartford; Claude E. Thibeault, Wethersfield, both of Conn.

[73] Assignee: United Technologies Corporation, Hartford, Conn.

[21] Appl. No.: 438,541

[22] Filed: Nov. 1, 1982

[51] Int. Cl.³ .............................................. F16J 15/08
[52] U.S. Cl. ..................................... 277/26; 277/218; 277/205; 277/236; 415/113
[58] Field of Search ............... 277/26, 216, 218, 220, 277/222, 205, 206 R, 232, 236; 415/113

[56] References Cited

U.S. PATENT DOCUMENTS

| | | | |
|---|---|---|---|
| 1,904,250 | 4/1933 | Purvis | 277/206 X |
| 2,875,917 | 3/1959 | Alkire | 277/26 X |
| 3,042,367 | 7/1962 | Welsh | 415/113 X |
| 3,207,524 | 9/1965 | Trbovich | 277/236 X |
| 3,245,693 | 4/1966 | Way | 277/222 |
| 3,313,553 | 4/1967 | Gastineau | 277/236 X |
| 3,520,544 | 7/1970 | Taylor | 277/236 X |
| 3,999,883 | 12/1976 | Nordenson | 415/113 |
| 4,218,067 | 8/1980 | Halling | 277/236 X |
| 4,336,943 | 6/1982 | Chaplin | 277/26 |

FOREIGN PATENT DOCUMENTS 610973  6/1926  France ................................. 277/26

Primary Examiner—Robert S. Ward
Attorney, Agent, or Firm—Gene D. Fleischhauer

[57] ABSTRACT

A free standing, continuous seal ring 54. The seal ring is effectively circumferentially continuous. The seal ring is adapted to extend between two circumferentially extending structures 38, 42. The structures 38, 42 separate a region 46 having a first pressure from a region 44 having a lower pressure. The seal ring is formed of two elements: a first element 78 having a circumferential gap G; and, a second element 80 extending across the gap G. Various construction details which enhance the efficiency of the seal ring are disclosed. In one particular embodiment, the second element is nested within the first element.

18 Claims, 5 Drawing Figures

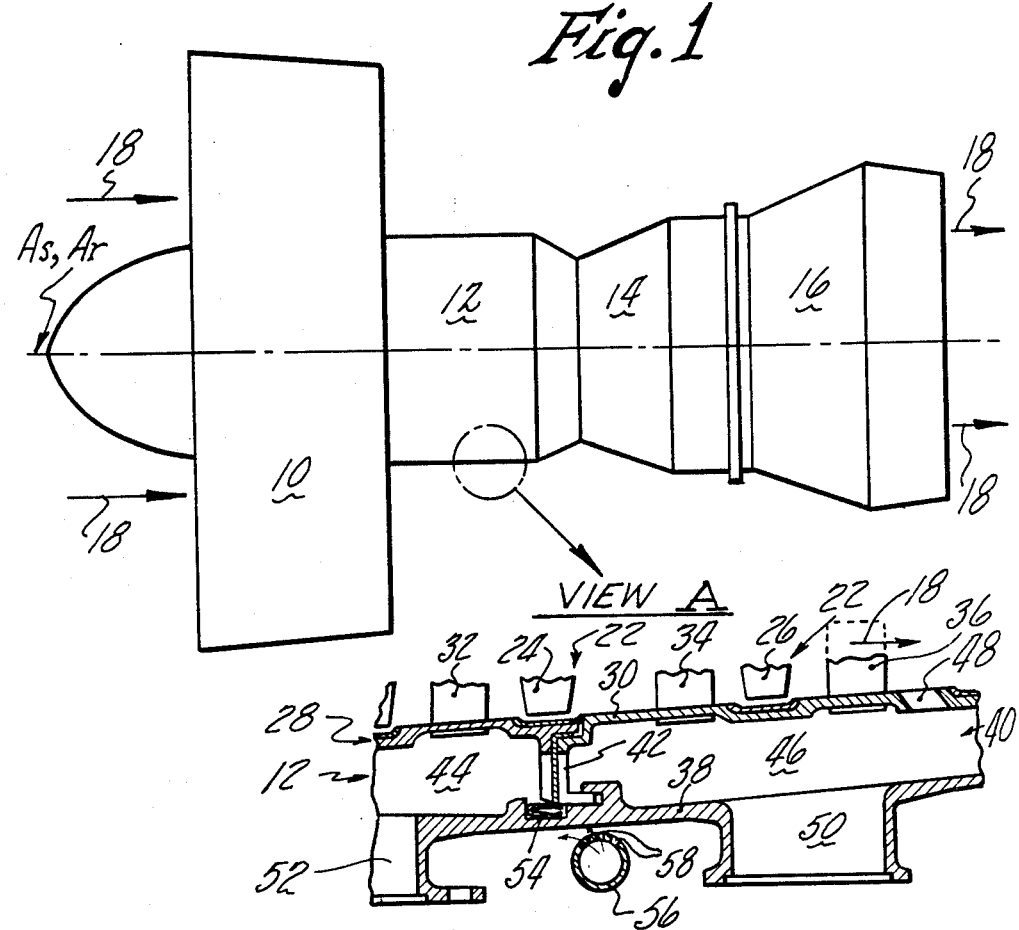
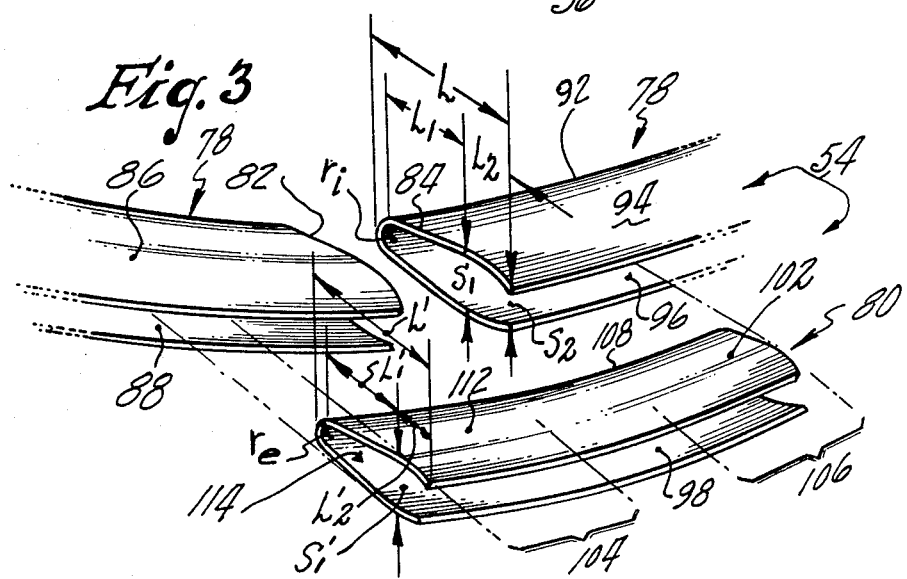

SEAL RING WITH SLIDABLE INNER ELEMENT BRIDGING CIRCUMFERENTIAL GAP

DESCRIPTION

1. Technical Field

This invention relates to an annular ring for sealing a joint between two adjacent structures and is particularly applicable to flanged joints of gas turbine engines. This invention was developed during work in the axial flow gas engine field and is applicable to other fields of endeavor.

2. Background Art

Conduits for working medium fluids have flow paths which are in fluid communication with joints between adjacent structures. Each joint is a potential leak path for the working medium fluid if the joint is in fluid communication with a region having a pressure which differs from the pressure of the flow path. Leak paths result from tolerance variations in the structures, from warpage of the structure due to uneven heating and cooling, from uneven thermal gradients in adjacent structures and even from design considerations which make it impossible for the structures to exactly conform one to the other. Accordingly, free standing seal members are often included in joints to block such leakage.

An example of a flanged joint incorporating a free standing, seal ring is shown in U.S. Pat. No. 3,520,544 entitled "Y-RING SEAL" issued to Taylor. The seal is disposed between two members and subjected to high compressive forces such that the seal is compressed until an internal line to line contact is created. Examples of other constructions are shown in U.S. Pat. No. 3,857,572 entitled "E-RING SEAL ASSEMBLY" issued to Taylor et al. and U.S. Pat. No. 3,758,123 entitled "OMEGA SEAL" issued to Ksieski. These seals, formed of circumferentially continuous rings, increase their sealing ability by using the pressure of the working fluid to force the seal ring against the adjacent structures.

In some applications, the seal ring is trapped within a joint. The joint may move radially with respect to the axis of symmetry of the seal ring more or less than the seal ring moves with respect to the axis. An example of such a joint is shown in British Pat. No. 417,637 entitled "IMPROVEMENTS RELATING TO HIGH PRESSURE PIPE JOINTS". In modern gas turbine engines, the difference in movement between the joint and the seal ring may cause a permanent deformation of the ring or rolling of the seal ring to such an extent that the sealing ability of the ring is lost. One solution to this problem is shown in U.S. Pat. No. 4,336,943 entitled "WEDGE-SHAPED SEAL FOR FLANGED JOINTS" issued to Chaplin. Chaplin capitalizes on the relative movement between the seal ring and the adjacent sealing structure to increase the sealing force between the seal and the convergent sidewalls of the joint.

The above art notwithstanding, scientists and engineers are working to develop a seal ring which accommodates differential growth between the joint and the seal ring and yet which provides the advantages of a continuous seal ring by using the fluid pressure acting on the seal ring to increase the sealing force between the seal ring and the adjacent structure.

DISCLOSURE OF INVENTION

According to the present invention, a free standing ring in an annular groove between two structures has a first annular element having a circumferential gap G and a second element extending across the gap G which is attached to the first element and slidably engages the first element to form an effectively continuous seal ring.

In accordance with one embodiment of the present invention, the seal ring has an inner element which is nested within an outer sleeve having a circumferential gap G.

A primary feature of the present invention is a first element which extends circumferentially about an axis of symmetry. The first element has a circumferential gap G. A second element extends across the gap G. The second element is attached to the first element and slidably engages the first element. In one embodiment, a feature is a first element having a pair of walls which diverge rearwardly for a first distance and converge rearwardly for a second distance. The walls of the second element diverge rearwardly for a first distance to a first span which is greater than the separation between the convergent walls of the first element to nest the second element within the first element.

A principal advantage of the present invention is the engine efficiency which results from blocking the leakage at a joint between adjacent stator structures with an effectively continuous seal ring. Another advantage is the fatigue life of the effectively continuous seal ring which results from the ability of the ring to change its diameter to accommodate thermal expansion and contraction of the seal ring and relative thermal expanison between the stator structures and the seal ring. Yet another advantage is the ease of assembling the seal ring to an annular groove which results from the ability of the ring to be both free standing and capable of accommodating changes in diameter with sliding elements.

The foregoing features and advantages of the present invention will become more apparent in the light of the following detailed description of the best mode for carrying out the invention and in the accompanying drawings.

BRIEF DESCRIPTION OF DRAWINGS

FIG. 1 is a side elevation view of a gas turbine engine with a portion of the case broken away and enlarged in view A.

FIG. 3 is an exploded perspective view showing a portion of the seal ring in the unassembled condition.

BEST MODE FOR CARRYING OUT INVENTION

Figure 2:
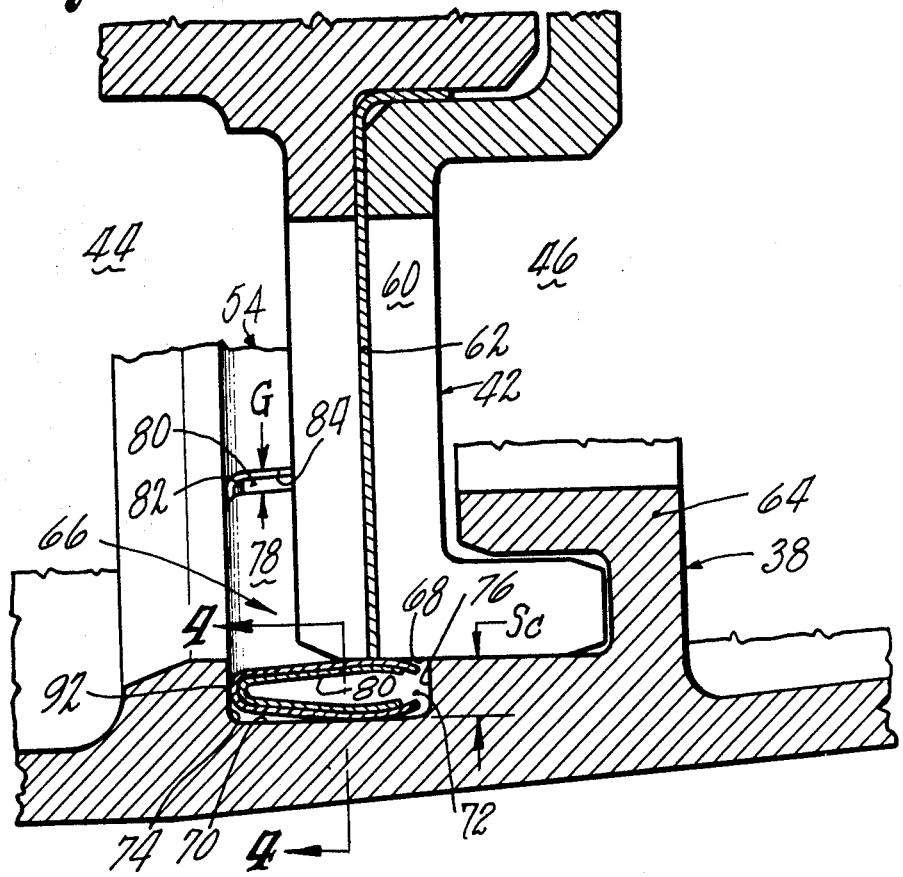
FIG. 2 is an enlarged cross sectional view of a portion of the engine shown in FIG. 1.

FIG. 1 illustrates a turbofan, gas turbine engine embodiment of the present invention. The engine has an axis of symmetry $A_s$ and an axis of rotation $A_r$. The principal sections of the engine include a fan section 10, a compressor section 12, a combustion section 14 and a turbine secton 16. An annular flow path 18 for working medium gases extends axially through the sections of the engine.

View A is an enlarged view of a portion of the compressor section 12. A rotor assembly 22 extends axially through the compression section about the axis of rotation $A_r$. The rotor assembly includes arrays of rotor blades as represented by the tips of the rotor blades 24 and 26. A stator assembly 28 circumscribes the working medium flow path and the arrays of rotor blades. The stator assembly includes a first stator structure such as an inner case 30. Arrays of stator vanes extend inwardly from the inner case across the working medium flow path as represented by the stator vane 32, the stator vane 34, and the stator vane 36.

The stator assembly 28 includes an outer case 38 which is circumferentially continuous. The outer case is spaced radially outwardly from the inner case 30 leaving an annular cavity 40 therebetween. A pair of flanges 42 extend circumferentially between the outer case and the inner case. The flanges are attached to the inner case and engage the outer case. The flanges divide the cavity into a first annular region 44 and a second annular region 46. A hole 48 in the inner case places the second region in fluid communication with the working medium flow path. A hole 50 in the outer case places the second region in fluid communication with a duct (not shown) for supplying cooling air to the turbine section or with a duct for supplying pressurized air to an aircraft. The first region is in fluid communication with the working medium flow path through a similar hole in the inner case. A hole 52 in the outer case places the first region in fluid communication with a duct for supplying pressurized air to the aircraft. A freestanding seal ring 54 extends between the circumferentially extending flanges and the circumferentially extending outer case.

A duct 56 for cooling air is spaced radially outwardly from the outer case 38 and extends circumferentially about the outer case. The duct is in fluid communication with a source of cooling air such as the fan section 10. The duct has a plurality of holes 58 for directing cooling air on the outer case.

FIG. 2 is an enlarged cross-sectional view of two of the adjacent stator structures shown in FIG. 1, the outer case 38 and the flanges 42. The flanges are formed of arcuate segments which extend circumferentially about the interior of the engine. Each segment has a slot 60 which extends radially to decrease the hoop strength of the flange. A feather seal 62 extends radially to block the high pressure gaseous fluid in the second region 46 from flowing into the lower pressure first region 44.

The outer case 38 has a flange 64 extending circumferentially about the outer case. The flange 64 adapts the case to engage the flanges 42. A joint 66 between the flanges 42 and the outer case includes a sidewall 68 on the flanges and a sidewall 70 on the outer case. The sidewall 68 is spaced radially from the sidewall 70 leaving a groove 72 therebetween. The groove extends circumferentially about the axis of the engine. The groove is bounded at the upstream end by a sidewall 74 and at the downstream end by a sidewall 76 each of which extends radially inwardly on the outer case. The seal ring 54 is formed of two elements 78, 80 which together form an effectively continuous seal ring which extends circumferentially about the axis of symmetry $A_s$. The first element 78 is a circumferentially extending element such as the outer sleeve. The outer sleeve has a first end 82 and a second end 84 spaced circumferentially from the first end leaving a circumferential gap G therebetween. The second element 80 extends across the gap G. The second element extends past the first end and is attached to the outer sleeve. The second element extends past the second end and slidably engages the outer sleeve forming an effectively continuous ring which extends circumferentially about the axis of rotation $A_r$ and the axis of symmetry $A_s$. Both the second element and the first element are formed of a nickel base superalloy AMS 5596 and have a nominal thickness of eight thousandths of an inch (0.008 inches).

FIG. 3 is a perspective view of a portion of the circumferentially continuous seal ring 54 showing the position of the outer sleeve 78 and the second element 80 prior to assembly. The outer sleeve and second element both have radial cross sections as shown by the end of inner element and the end 84 of the outer sleeve. The outer sleeve has an external surface 86 and an internal surface 88. The outer sleeve has a tip region 92. The tip region is the forwardmost portion of the outer sleeve and has an internal radius $r_i$. A first wall 94 and a second wall 96 are joined together by the tip region. The outer sleeve has an overall length L measured rearwardly from the tip region along a line parallel to a line midway between the walls. The walls diverge rearwardly from each other for a first distance $L_1$ from the tip region to a first internal span $S_1$. The walls converge rearwardly for a second distance $L_2$ to a second internal span $S_2$. The walls have an elliptical shape over the rearward portion of the distance $L_1$ and over the entire distance $L_2$. Conversely, the first wall and the second wall converge forwardly from the first span $S_1$ to the tip region.

The second (inner) element 80 extends across the gap G. The second element has an internal surface 98 and an external surface 102. The inner element has a first portion 104 which extends past the first end 82 of the outer sleeve. The first portion is attached to the first element. The second element has a second portion 106 which extends past the second end 84 of the outer sleeve. The second portion slidably engages the outer sleeve in the circumferential and axial directions. The second element has a tip region 108. The tip region is the forwardmost portion of the second element and has an external radius $r_e$ which is nominally equal to the radius $r_i$ of the outer sleeve. A first wall 112 and a second wall 114 are joined one to the other by the tip region 108. The first wall and second wall are contoured to conform to the walls of the outer sleeve. The second element has an overall length $L'$ measured rearwardly from the tip region along a line parallel to a line midway between the walls. The walls diverge rearwardly from each other for a first distance $L_1'$ to a first external span $S_1'$. The span $S_1'$ is greater than the internal span $S_2$ of the walls on the outer sleeve. As a result, the inner element is trapped and nested within the outer sleeve in the assembled condition.

As shown in FIG. 2, the outer element is further deflected in the installed condition by the sidewall 68 on the flange 42 and the sidewall 70 on the outer case 38. In the installed condition the walls of the first element diverge to a span $S_c$ which is smaller than the span $S_1$ between the external surfaces in the free condition.

Figure 4:
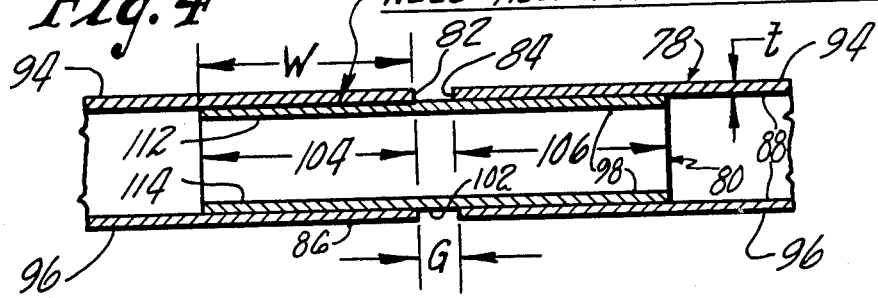
FIG. 4 is an enlarged cross sectional, developed view taken along the lines 4—4 of FIG. 2 with portions of the adjacent stator structures broken away.

FIG. 4 is a cross-sectional developed view of a portion of the seal ring 54 along the lines 4—4 of FIG. 2 looking forwardly toward the tip region 92 of the seal ring with the flanges 42 and the outer case 38 removed for clarity. During assembly the first portion 104 of the second element 80 is attached to the outer sleeve by a bonding process such as electron beam welding along the line W or is attached to the outer sleeve by mechanical means such as a flush rivet or the like. The weld locates the second element circumferentially with respect to the outer sleeve and yet permits the first portion and the second portion 106 of second element to move axially with respect to the outer sleeve in response to operational pressures. As discussed before, the second portion of the inner element slidably engages the outer sleeve in both the axial and circumferential directions.

Figure 5:
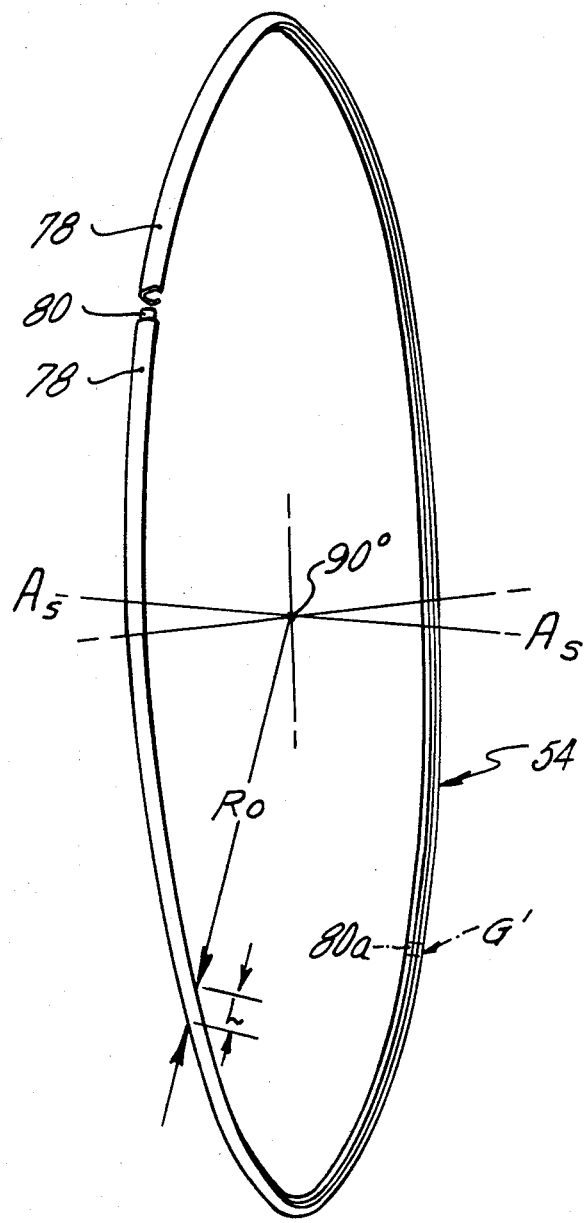
FIG. 5 is a perspective view of the seal ring with a portion of the seal ring broken away to show the cross sectional shape of the seal ring.

FIG. 5 is a perspective view of the seal ring 54 with portions of the ring broken away to show the radial cross-sectional shape of the ring in the region of the second element 80. The ring might alternatively be provided with a second gap G' and a second inner element 80a as shown by dotted lines. The gap G' is enlarged for clarity. The average diameter of the seal ring $D_o$ is twice the average radius $R_o$ of the seal ring. The ratio of the average diameter $D_o$ of the seal ring to the overall length L is greater than fifty ($D_o/L > 50$). The upper limit on the ratio of the diameter of the ring to the axial length of the ring is much greater than the limit for equivalent one-piece seal rings. A one-piece seal ring having a fixed diameter which is not capable of slidable movement in the circumferential direction is more susceptible to rolling as the ratio of the diameter to length ($D_o/L$) of the ring increases. Rolling is defined as the tendency of the ring to turn inside out in response to external forces. Rolling is discussed in Roark and Young, *Formulas for Stress and Strain*, McGraw and Hill Book Company (Fifth Edition, 1975) at page 384. The slidable engagement of the elements of the seal ring leaves the ring free to expand radially in response to external forces, greatly decreasing the ability of such external forces to turn the ring inside out as compared with an equivalent one-piece ring. The ratio of the length to the span $S_1$ of the ring is greater than or equal to two ($L/S_1 \geq 2$) and the ratio of the span $S_1$ and the span $S_1'$ to the thickness is greater than twenty to one ($S_1/t, S'_1/t > 20$). This insures that the seal ring exhibits enough flexibility to accommodate radial movement without permanent deformation as the ring is compressed to its installed span $S_c$ both before and during operation of the engine. Equivalent one-piece rings exhibit greater stress over the entire circumference of the ring during such compression and accordingly require a greater length to span to exhibit the same flexibility.

During operation of the gas turbine engine, working medium fluids in the form of gases are flowed rearwardly along the flow path 18. As the gases move through the compressor section, the pressure and temperature of the gases is increased by the rotor assembly 22. The pressurized gases are bled from the flow path through the hole 48 into the annular second region 46 and through other holes into the annular first region 44. The gases in the first region are at a first pressure. The gases in the second region are at a second pressure which is higher than the first pressure.

The seal ring 54 blocks the high pressure gases from flowing from the second region 46 into the first region 44. The internal surface 98 of the second element 80 and the internal surface 88 of the outer sleeve 78 face the high pressure gases from the second region. The external surface 86 of the sleeve and the external surface 102 of the second element face the low pressure gases of the first region. The difference in pressure between the regions may be as high as seventy-five pounds per square inch (75 psia). The difference in pressure between the regions urges the second element 80 forwardly toward the tip region 92 and outwardly against the walls 94, 96 of the outer sleeve 78. The sidewall 74 restrains the outer sleeve against axial movement causing the tip region 92 to press against the sidewall with a sealing force. The sidewalls 68, 70 of the stator structure restrain the walls against radial movement causing the walls to press against the sidewalls with a sealing force. The elliptical surface on the rearward portion of the seal ring insures that a gently curving surface engages both sidewalls to form a tight seal. As a result, the second element is driven forwardly against the tip region and against the converging walls of the sleeve causing the second element to conform to the contour of the outer sleeve despite tolerance variations which might cause differences in the contours of the second element and the outer sleeve.

As the temperatures of the engine reaches steady state conditions, the outer case 38 expands outwardly away from the rotor assembly 22. The seal ring 54, trapped in the joint 66, moves outwardly with the case. The second element 80 of the ring slides within the outer sleeve 78 maintaining sealing contact between the elements as the diameter changes. Differences in thermal expansion between the seal ring and the stator structures are automatically accommodated by this sliding engagement. After the engine reaches steady state conditions, cooling air is impinged on the outer case through the duct 56 decreasing the temperature of the case and causing the outer case to contract. The outer case moves radially inwardly decreasing the clearance between the rotor assembly and the inner case 30 forcing the seal ring to a smaller diameter. The seal ring accommodates this further change in diameter by the sliding engagement of the second element and the outer sleeve. Thus, the seal ring accommodates thermal expansion of the ring and the stator structures and accommodates relative movement of the flanges 42 with respect to the outer case while maintaining a seal between the structures, all without distorting the seal ring or rolling the seal ring to an extent that destroys the sealing contact between the curved surfaces of the ring and the sidewalls of the joint.

Although the invention has been shown and described with respect to detailed embodiments thereof, it should be understood by those skilled in the art that various changes in form and detail thereof may be made without departing from the spirit and the scope of the claimed invention.

We claim:
1. A seal ring of the type which is free standing, circumferentially continuous, and adapted to extend between two circumferentially extending structures, which comprises:
   a first circumferentially extending element which has a first end and a second end spaced circumferentially from the first end leaving a circumferential gap G therebetween, and
   a second element extending across the gap G which extends past the first end and is attached to the first element and which extends past the second end and slidably engages the first element to form a continuous ring which is capable of expanding or contracting in response to operative temperatures, pressure and loads.
2. The seal ring of claim 1 wherein one of said elements is a sleeve which extends over the other element.
3. The seal ring of claim 1 wherein the first element has a radial cross section having a tip region and walls diverging rearwardly from the tip region and the second element has a tip region and walls diverging rear- wardly from the tip region and wherein the first element and the second element are nested together.

4. The seal ring of claim 3 wherein the walls of the first element diverge rearwardly for a first distance from the tip region to a first span $S_1$ and converge rearwardly for a second distance to a second span $S_2$ and wherein the walls of the second element diverge rearwardly from the tip region for a first distance to a first span $S_1'$ which is greater than the second span $S_2$ and less than or equal to the first span $S_1$ to trap the second element with respect to the first element.

5. The seal ring of claim 2 wherein the first element extends over the second element to nest the second element within the first element.

6. The seal ring of claim 3 wherein the first element extends over the second element to nest the second element within the first element.

7. The seal ring of claim 4 wherein the seal ring has an overall length L and the ratio of the mean diameter of the seal ring to the length L is greater than fifty to one ($D_o/L \geq 50$) and the ratio of L to $S_1$ is greater than or equal to two to one ($L/S_1 \geq 2$).

8. The seal ring of claim 4 wherein the seal ring is formed of a nickel base superalloy.

9. The seal ring of claim 7 wherein the seal ring is formed of a nickel base superalloy.

10. The seal ring of claim 8 wherein the first element and the second element have a span $S_1$ to thickness t ratio which is greater than twenty to one ($S_1/t > 20$).

11. The seal ring of claim 9 wherein the first element and the second element have a span $S_1$ to the thickness t ratio which is greater than twenty to one ($S_1/t > 20$).

12. A continuous seal ring extending circumferentially about an axis of symmetry, which comprises:

an outer sleeve which extends circumferentially about the axis of symmetry and which has an internal surface, the outer sleeve having
a first end,
a second end spaced circumferentially from the first end leaving a circumferential gap G therebetween,
a tip region,
a first wall extending circumferentially about the axis of symmetry between the first end and the second end,
a second wall extending circumferentially about the axis of symmetry from the first end to the second end, the second wall being joined to the first wall by the tip region and diverging from the first wall,
a radial cross section having a V-shaped geometry formed by the tip region and the diverging walls; and, an inner member which has an external surface, the inner member having
a first end,
a second end,
a tip region,
a first wall extending circumferentially between the first end and the second end,
a second wall extending circumferentially between the first end and the second end, the second wall being joined to the first wall by the tip region and diverging from the first wall,
a radial cross section having a V-shaped geometry formed by the diverging walls; wherein the inner member is nested within the outer sleeve such that the external surface of the inner member conforms to the internal surface of the outer member and wherein the inner member extends across the gap G, is attached to the walls of the outer sleeve on one side of the gap and slidably engages the walls of the outer sleeve on the other side of the gap to permit radial expansion and contraction of the seal.

13. The continuous seal ring of claim 12 wherein the walls of the first element diverge rearwardly for a first distance from the tip region to a first span $S_1$ and converge rearwardly with an elliptical shape for a second distance to a second span $S_2$ and wherein the walls of the second element diverge rearwardly from the tip region for a first distance to a first span $S_1'$ which is greater than the second span $S_2$ and less than or equal to the first span $S_1$ to trap the second element with respect to the first element.

14. A joint between two adjacent stator structures which bound a first region having a fluid at a first pressure and a second region having a fluid at a second pressure which is higher than the first pressure, the stator structures having a pair of sidewalls, one on each of the stator structures forming a circumferentially extending groove between the structures which is in fluid communication with each of the regions, wherein the improvement comprises:

a circumferentially continuous seal ring disposed in the groove for blocking the flow of fluid from the second region to the first region which includes
a first circumferentially extending element which has
a first end,
a second end spaced circumferentially from the first end leaving a circumferential gap G therebetween,
a radial cross section having a tip region which is the forwardmost portion of the first element and having walls diverging rearwardly from the tip region;
an internal surface, and
an external surface;
a second element extending across the gap G which has
a first portion which extends past the first end of the first element and which is attached to the first element,
a second portion which extends past the second end of the first element and which slidably engages the first element,
a radial cross section having a tip region which is the forwardmost portion of the second element and having walls diverging rearwardly from the tip region,
an internal surface, and
an external surface; and,
means for restraining one of said elements against forward movement;
wherein one wall of the restrained element engages one of said sidewalls, a second wall of the restrained element engages the second of said sidewalls, the internal surface faces the high pressure fluid and the external surface faces the low pressure fluid, wherein the remaining element is nested within the restrained element, with the internal surface facing the high pressure fluid, the external surface facing the low pressure fluid and with the walls of the remaining element engaging the converging walls of the restrained element and wherein the inner element is driven in operative response to the difference in pressures against the converging walls of the restrained element to urge the external surface of the element against the internal surface of the restrained element and to urge the external surface of the restrained element against the sidewalls.

15. The joint between two adjacent stator structures of claim 14 wherein the means for restraining an element engages the tip region of the element.

16. The joint as claimed in claim 15 wherein said sidewalls are substantially parallel and the means for restraining the tip region of one of the elements is a third sidewall attached to one of said stator structure.

17. The joint as claimed in claim 16 wherein the restrained element is the first element.

18. The joint as claimed in claim 17 wherein the walls of the first element diverge to a distance $S_1$ in the free condition and diverge to a distance $S_c$ in the installed condition which is smaller than the distance $S_1$.

* * * * *